United States Patent [19]

Burman

[11] Patent Number: 5,009,192

[45] Date of Patent: Apr. 23, 1991

[54] ANIMAL DETERRENT APPARATUS

[76] Inventor: Barry A. Burman, RR #6, 592 Cheryl Place, Victoria, B.C., Canada, U8X 3X2

[21] Appl. No.: 584,237

[22] Filed: Sep. 18, 1990

[51] Int. Cl.$^5$ .............................................. A01K 15/00
[52] U.S. Cl. ...................................... 119/29; 340/573; 239/69
[58] Field of Search .................... 340/573; 239/67, 69; 119/29, 96

[56] References Cited

U.S. PATENT DOCUMENTS 3,396,277  8/1968  Chevreliere ...................... 239/67 X Primary Examiner—Gene Mancene
Assistant Examiner—R. Thomas Price
Attorney, Agent, or Firm—Townsend and Townsend

[57] ABSTRACT

An apparatus for deterring animals from intruding into gardens, fields, yards, etc. has at least one sprinkler which produces an initial sudden jet of water to frighten or startle an animal. The apparatus has a water sprinkler, preferably on which is an impulse type sprinkler that produces a series of pulse sprays. The sprinkler has a connection line to a water supply a low voltage electrically operated shut-off valve is provided in the connection line with a low voltage battery or other type of power source. An infrared proximity sensor senses a presence such as an animal. The sensor is powered by a battery and opens the shut-off valve in the connection line to turn on the sprinkler.

10 Claims, 2 Drawing Sheets

ANIMAL DETERRENT APPARATUS

TECHNICAL FIELD

The present invention relates to an apparatus and a method of deterring animals from entering certain areas and more specifically to a device to spray water when an animal presence is detected in specific areas.

BACKGROUND ART

In fields, yards and gardens, including nursery gardens, damage can be done by animals such as deer, rabbits, etc. coming into the garden at night and eating the plants. Farmers also are troubled by animals who stampede through grain and eat or damage crops. Fences and the like are used, and these have the desired effect of keeping the animals away, however, these can be expensive and, therefore, there is a requirement for a reasonably cheap system to deter animals from gardens, golf courses, and the like.

There is a need to deter animals, including domestic animals such as cats and dogs, together with many other animals from certain areas, but not hurt the animals in any way. Furthermore, there is a requirement to have a deterrent device for animals which does not harm the environment.

DISCLOSURE OF THE INVENTION

The present invention provides a device which activates a sprinkler when an animal enters a certain area and provides several pulses of water until the animal moves out of the area. Pulse type sprinklers have a definite tick tick noise as they move through an arc and these may be set up to be activated when an animal is detected in a specific area. The sprinkler is activated only for the time that the animal is in the area, and projects a jet of water from the sprinkler which may or may not contact the animal, however, it is found that the animal tends to be frightened by both by the noise and by the initial sudden jet of water, particularly in the middle of the night when it can't be seen. Most small animals are frightened by the noise and movement of the sprinkler and the water, and the system has been found to be a most effective deterrent. Animals immediately leave the area.

The action of the flying water and the noise deters nearly all animals away from the spraying area and even outside the area. The water spray is not harmful to the plants or the animals. It allows small birds, small animals and insects to go undetected. When no motion is detected in the area then the sprinkler stops, although a time delay may be provided to continue sprinkling if desired.

The detection devices comprises a motion sensor, preferably an infrared motion sensor which is set to detect movement in a particular area, generally in an arc up to about 50 feet away from the motion detector.

The distance the detector is activated depends upon the requirement of the apparatus. The motion sensor is a commercially available piece of equipment and units with different ranges and sensitivity can be provided as desired.

The sprinkler can be placed adjacent to the motion sensor or on other suitable positions. The water droplets from the sprinkler do not activate the motion sensor as they are too small and in the case of an IR sensor, too cold.

The present invention provides an apparatus to deter animals comprising in combination a water sprinkler with connection line to a water supply, a low voltage electrically operated shut-off valve in the connection line, low voltage power supply means for the shut-off valve, and infrared proximity sensor for sensing a presence, the sensor powered by the power supply means, adapted to open the shut-off valve in the connection line to the sprinkler when the sensor senses a presence.

There is also provided a method of deterring animals comprising the steps of sensing a presence of a moving animal by an infrared sensor, providing a low voltage signal from the sensor to activate a shut-off valve in a connection line from a water supply, and operating an impulse type sprinkler attached to the connection line to spray water when the sensor senses the presence of a moving animal.

BRIEF DESCRIPTION OF THE DRAWINGS

In drawings which illustrate embodiments of the present invention.

DETAILED DESCRIPTION OF THE INVENTION

Figure 1:
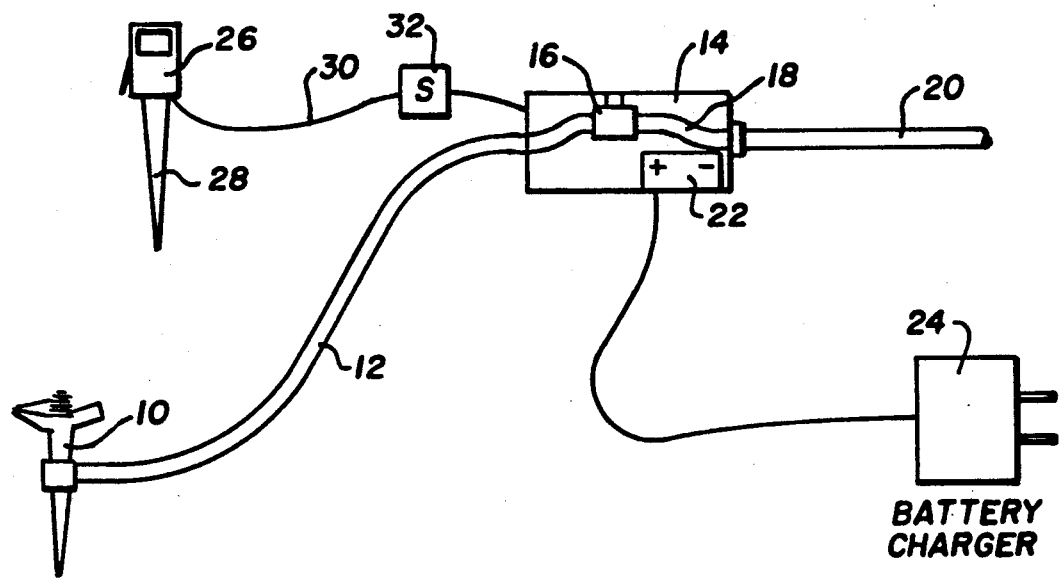
FIG. 1 is a schematic view showing the elements according to one embodiment of the present invention.

In its simplest form, the deterrent device comprises a sprinkler 10 as shown in FIG. 1 which is an impulse sprinkler having a connection to a hose 12 leading to an enclosure 14. Inside the enclosure 14 is a water solenoid valve 16 and a connection line 18 that connects to a hose 20. The hose 20 is preferably connected to a garden water supply or other suitable water supply system as will be discussed hereafter. A power supply, generally in the form of a battery 22, preferably a small 12 volt battery or 6 volt battery, is positioned in the enclosure 14 for providing power to operate the solenoid valve 16 and the IR sensor 26. The battery 22 may have a connection to a battery charger 24 which in turn is connected into the household power supply. However, the voltage to operate the device is always low so no danger can occur if the enclosure 14 or cable to the battery charger 24 become wet.

An IR sensor 26, preferably of the type which scans an arc and detects movement in that arc is provided mounted on a spike 28 so that it can be set in the ground, positioned to cover a particular arc. A low voltage electric line 30 from the IR sensor leads to the enclosure 14. When the IR sensor 26 detects a presence, it produces an electrical signal to open the solenoid valve 16 and thus permit water to flow to the sprinkler 10. The signal from the sensor 26 only occurs as long as there is movement within the area covered by the sensor 26. As soon as an animal leaves the protected area, the signal from the sensor 26 turns off because there is no movement within the protected area, and the solenoid valve 16 shuts preventing the flow of water to the sprinkler and the IR sensor 26 rearms for the next detection. A cut out switch 32 is shown in the low voltage electric line 30 to deactivate the IR sensor 26. A further switch (not shown) may also be provided on the enclosure 14 to isolate the battery 22 or the power source. The further switch would generally replace cut out switch 32, as two switches are not necessary.

Figure 2:
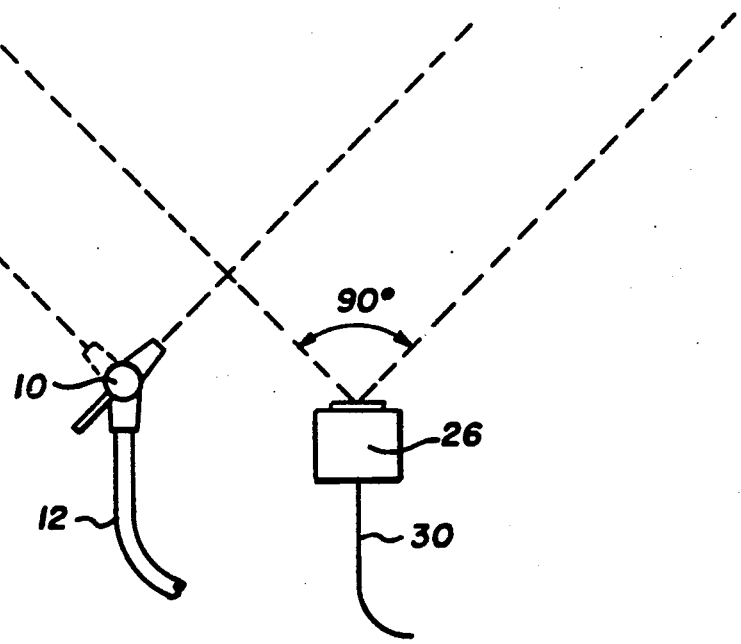
FIG. 2 is a detailed plan view showing a sprinkler and sensor positioned side by side.

An arrangement of sprinkler 10 and sensor 26 is shown in FIG. 2. The sensor 26 senses an area representing an arc of approximately 90° as an example and extending for approximately 50 feet. The sprinkler 10 can be placed in front of an IR sensor 26 and does not keep the sensor activated as both the sprinkler 10 and water coming from the sensor are cold and do not set or keep the sprinkler 10 going. The water droplets spraying out do not activate the sensor as they are cold. The sprinkler is the pulse type which rotates through an arc sending out pulses as it rotates. The sprinkler can be set to cover a desired angle, or can rotate completely around the head. Generally when an animals presence is detected, the sprinkler comes on and only completes three or four pulses before the animal flees from the area. No movement is detected by the sensor 26 when the animal has gone, and the solenoid valve 16 turns off the sprinkler 10. A time delay may be incorporated to provide a continuation of spraying from the sprinkler for a short time if it is required.

Figure 3:
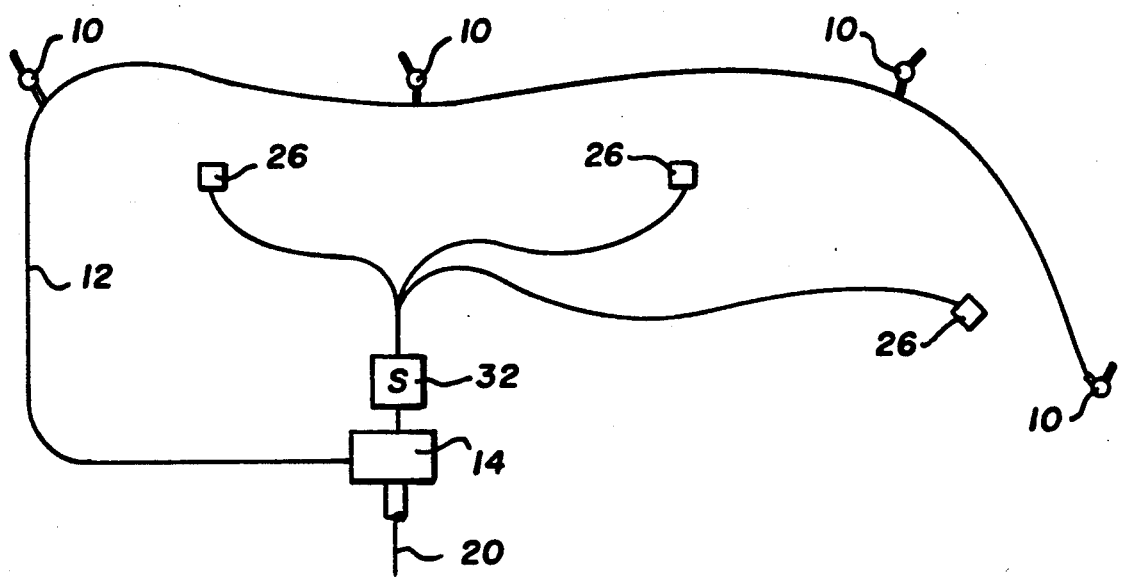
FIG. 3 is a schematic view showing an arrrangement of multiple sprinklers and sensors.

An arrangement of multiple sprinklers is shown in the layout of FIG. 3. The multiple sprinklers 10 are arranged to feed off a water line 12 from the enclosure 14. Three sensors 26 are shown positioned between the sprinklers 10. If any one sensor detects movement it activates the solenoid valve 16 and all the sprinklers start up immediately. Whereas three sensors 26 are shown herein, one large sensor having a wider range than the others may be provided. When the sprinklers are sprinkling, they do not trigger the sensor, to keep the sprinklers on at all times.

Figure 4:
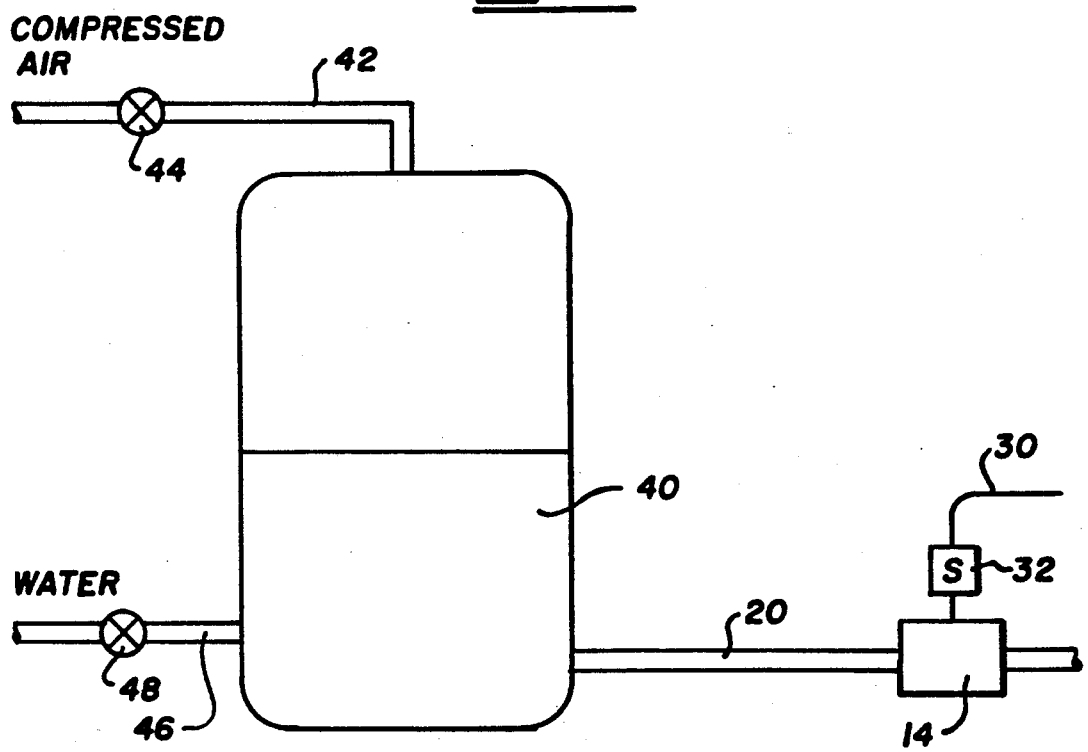
FIG. 4 is a schematic view showing a water tank with compressed air therein to provide a water supply for the deterrent device.

In another embodiment, as shown in FIG. 4 a water container or tank 40 partially full of water with compressed air in the remainder of the tank 40, the air is fed into the tank 40 through a compressed air line 42 and valve 44. Air in the tank is compressed and provides a pressure on the water in the tank 40. A water inlet 46 with a valve 48 allows water from a water supply to fill up the tank when the pressure in the tank is released. The valve 48 may be closed so that the system then becomes a completely enclosed system not dependent upon a water supply. The operation of the system is substantially the same as that shown in FIGS. 1, 2 or 3. When a sensor 26 detects movement, it opens the solenoid valve 16 and the sprinklers 10 commence sprinkling. Pressure to the sprinklers is provided by the compressed air in the tank 40. This pushes the water down through hose 20. When the water in the tank 40 is finished, then compressed air can pass out through the sprinkler heads and this provides a hissing noise which is also a deterrent to animals.

In another embodiment a harmless vegetable dye is placed in the water in the tank 40. This dye may be used for identifying animals. For instance a dog or cat that is seen the next day with a particular dye marked upon it would be known to be the animal that was attempting to encroach upon the protected area.

The system may be connected to an in-ground sprinkler system for gardens, golf courses and the like. Other noise makers may be included in the system such as a radio, tape recorder and the like. A compressed air tank, which provides a considerable hiss when the air escapes may also be provided with a water line to increase the noise level to act as a deterrent. Whereas a pulsing type sprinkler has been described herein, other types of sprinklers may be used, such as a rotating sprinkler head that spins around or a plane water jet arrangement.

Various changes may be made to the embodiments shown herein without departing from the scope of the present invention which is limited only by the following claims.

The embodiments of the present invention in which an exclusive property or privilege is claimed are defined as follows:

1. An apparatus to deter animals comprising in combination:
   a water sprinkler with connection line to a water supply,
   a low voltage electrically operated shut-off valve in the connection line,
   low voltage power supply means for the shut-off valve, and
   infrared proximity sensor for sensing a presence, the sensor powered by the power supply means, adapted to open the shut-off valve in the connection line to the sprinkler when the sensor senses a presence.

2. The apparatus to deter animals according to claim 1 wherein the water sprinkler is an impulse type sprinkler that produces a series of pulse sprays rotating for a predetermined angle around the sprinkler.

3. The apparatus to deter animals according to claim 1 wherein the low voltage power supply is from a 12 volt battery.

4. The apparatus to deter animals according to claim 3 including a battery charger connectable to a household power supply.

5. The apparatus to deter animals according to claim 1 wherein the infrared sensor is placed adjacent the water sprinkler.

6. The apparatus to deter animals according to claim 1 including a plurality of sprinklers activated by at least one sensor.

7. The apparatus to deter animals according to claim 1 wherein the water supply comprises a container to hold water and means to supply compressed air to the container.

8. The apparatus to deter animals according to claim 7 including means to supply dye to the water in the tank.

9. A method of deterring animals comprising the steps of:
   sensing a presence of a moving animal by an infrared sensor,
   providing a low voltage signal from the sensor to activate a shut-off valve in a connection line from a water supply, and
   operating an impulse type sprinkler attached to the connection line to spray water when the sensor senses the presence of a moving animal.

10. The method of deterring animals according to claim 9 wherein the water supply has a dye mixed with the water to spray animals and identify them as intruders.